324-77
SEARCH ROOM

June 18, 1957 H. HURVITZ 2,796,584

TWO DIMENSIONAL ELECTROLUMINESCENT DISPLAY

Filed March 21, 1955

INVENTOR

Hyman Hurvitz 2,796,584

TWO DIMENSIONAL ELECTROLUMINESCENT DISPLAY

Hyman Hurvitz, Washington, D. C.

Application March 21, 1955, Serial No. 495,705

11 Claims. (Cl. 324—77)

Figure 2:
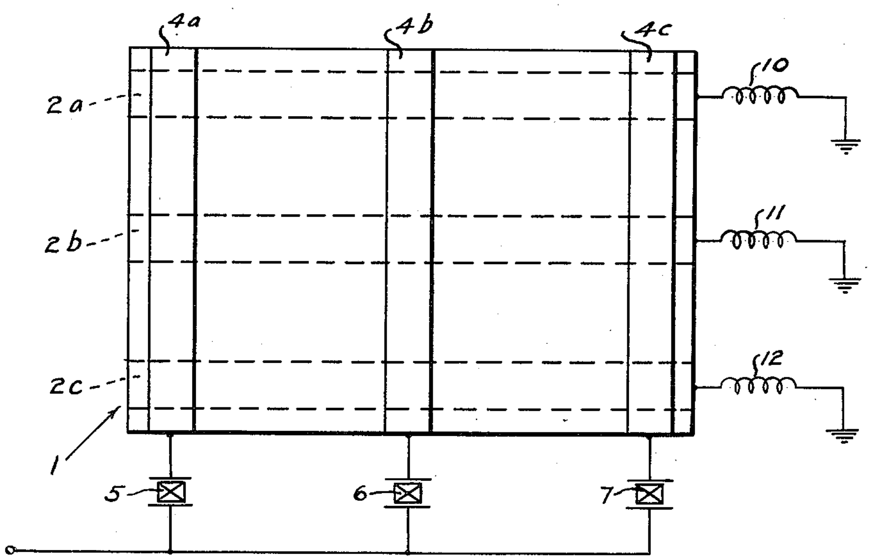

The present invention relates generally to visual display systems, and more particularly to systems for displaying information in a two-dimensional raster in terms of excitation of a plate of electroluminescent phosphor.

In my previously filed application for Letters Patent of the United States, Serial No. 477,892, filed December 27, 1954, I disclosed how to provide a two-dimensional display on an electroluminescent plate, each element of the display requiring use of one piezo-electric filter, or other filter circuit. It is the primary feature of the present invention that the display may be produced with a reduced number of filter elements, by taking advantage of the multiple frequency responses of piezo-electric crystal filters.

It is known that if a layer of electroluminescent phosphor is deposited on a plate of conductive glass, or other transparent insulating material, the phosphor being dispersed in an insulating or semi-conductive carrier, that visual displays may be produced at isolated points of the phosphor by applying A. C. voltage between a probe touching the phosphor and the conductive plate. The phosphor glows, in such case, only directly under the probe. The probe then is electrically one electrode of a condenser, the conductive plate a second electrode, and the phosphor baring layer is the dielectric of the condenser. Such a condenser may be connected in series with a tuning coil and with a piezo-electric crystal, the resonant frequency of the coil and condenser being equal or nearly equal to that of the crystal, but the Q of the separate circuits being widely different.

When a signal is applied to the series combination, and is at the resonant frequency of the piezo-electric crystal the latter acts as a closed switch, i. e. it possesses zero impedance. The entire voltage is then applied across the coil and condenser, and the Q of the latter circuit being about 30–50, a high voltage is developed across the condenser, which glows. For any other frequency the piezo-electric crystal is effectively an open circuit, and no glow develops.

The Q of the crystal may fall in the range 1,000 to 10,000. Hence, a plurality of crystals may be connected in series with a single tuning coil, but each in series with a different point of the phosphor bearing layer. More specifically, the coil may be connected between the conductive plate and ground, and the piezo-electric crystals between points of the phosphor and a signal terminal.

It is, however, known that a piezo-electric crystal resonates with equal facility at a large number of harmonic frequencies, up to several thousand. A single piezo-electric crystal may, therefore, be connected in series with a plurality of separate electroluminescent condensers, all these in parallel with one another, and each condenser connected to ground via a tuning coil which tunes its associated condenser to a different harmonic frequency. The signal piezo-electric crystal now is in open circuit to a plurality of harmonically related signals, but each of these finds only a single resonant electroluminescent element, so that each harmonic frequency produces its own separate display. Due to the low Q of the electroluminescent elements, and the high Q of the piezo-electric crystals, one tuning coil may operate with a large number of piezo-electric crystals, at adjacent frequencies. A first plate may, therefore, support a large number of display points, each representative of a different adjacent frequency, the remaining plates supporting displays representative of frequencies harmonically related to the frequencies which generated the displays of the first plate.

In a practical embodiment of my invention I employ a matrix arrangement to simplify construction. Specifically, I utilize conductive glass, but provide a series of parallel lines of conductive coating on the glass, the lines being separated and mutually insulated. I employ a series of conductive lines on the phosphor, which are parallel, separated and mutually insulated, and which extend at right angles to the first mentioned lines. The two sets of lines then form a matrix, phosphor existing between the cross-over points. A visual display may then be produced at any one point of the screen by applying voltage between a suitably selected pair of conductive lines, one line of the pair taken from each separate set of lines. This construction is suggested in the U. S. patent to Piper 2,698,915.

In accordance with the present invention a plurality of piezo-electric crystals is provided, tuned respectively to closely adjacent frequencies, and each connected in one-to-one relation in series with one of the lines of one set of parallel lines, and all in parallel with a single source of signals. The lines of the remaining sets are connected separately to ground via tuning coils, which tune the lines of the remaining set each to a different range of harmonically related frequencies, i. e. to a range covered by the piezo-electric crystals when operating on a selected harmonic frequency.

While in accordance with my invention as disclosed in my application for U. S. patent, Serial No. 477,892, display of N frequencies required N piezo-electric crystal filters, in accordance with the present invention this number may be radically reduced, a limiting value being $\sqrt{N}$.

It is, accordingly, a broad object of my invention to provide an electroluminescent spectrum analyzer utilizing a minimum number of filter circuits for analysis of a maximum number of discrete frequencies.

It is a more specific object of the present invention to provide an electroluminescent display device which utilizes a matrix arrangement of energizing conductors for selectively activating a plurality of points of the display.

Figure 1:
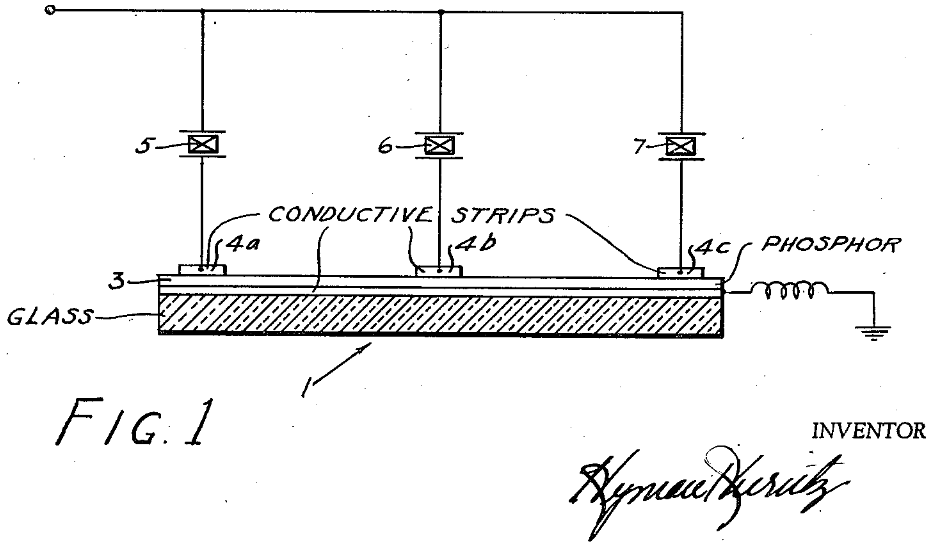

The above and still further features, objects, and advantages of the invention will become apparent upon consideration of the following detailed description of a specific embodiment of the invention, especially when taken in conjunction with the accompanying drawings, wherein:

Figure 1 is a view in front elevation of a system in accordance with the invention; and Figure 2 is a schematic diagram of the system of Figure 1, with certain structural features in plan.

Referring now more particularly to the accompanying drawings, there is shown a nine element display device, including three rows and three columns. The number nine is selected as exemplary only, and the number may obviously be extended. The reference numeral 1 denotes a plate of non-conductive glass, having a series of three parallel conductive stripes 2$a$, 2$b$, 2$c$, painted thereon. Over the stripes 2$a$, 2$b$, 2$c$ is laid a layer of electroluminescent phosphor 3 embedding in insulating material. On the phosphor 3 is laid a series of stripes 4$a$, 4$b$, 4$c$, extending perpendicular to the stripes 2$a$, 2$b$, 2$c$. Luminous displays may be produced at points of intersection of any of stripes 2$a$, 2$b$, 2$c$, with any of stripes 4$a$, 4$b$, 4c, by application of A. C. voltage to the intersecting stripes.

A series of three piezo-electric crystals 5, 6, 7, are commonly connected to a signal input terminal, so that the signal is applied in parallel to the separate crystals. Each of the crystals is connected to a different one of the leads 4*a*, 4*b*, 4*c* one crystal being in series with each lead. We assume, for the sake of example, that the crystals 5, 6, 7, are respectively series resonant at their fundamental frequencies, to frequencies $f-\Delta f$, $f$, and $f+\Delta f$, and that $\Delta f$ is small relative to $f$.

Connected between lead 2*a* and ground is a tuning coil 10, which tunes lead 2*a*, considered as a condenser, to frequency $f$.

Connected between lead 2*b* and ground is a tuning coil, 11, which tunes lead 2*b*, considered as a condenser, to frequency 2*f*.

Connected between lead 2*c* and ground is a tuning coil 12, which tunes lead 2*c*, considered as a condenser, to frequency 3*f*.

The series tuned circuits tuned by coils 10, 11, 12 are broadly tuned, with Q of about 20–40, and the resonance curves of their circuits, in relation to the center frequencies, is assumed sufficiently separated that no overlap occurs.

On this basis, a signal at frequency $f-\Delta f$ is passed only by crystal 5, energizing lead 4*a*. This signal finds a resonant path to ground only via coil 10, and hence a high voltage exists only across the cross-over of leads 2*a* and 4*a*. This point alone then glows.

For a frequency 2$(f-\Delta f)$ the crystal 5 again is series resonant, and applies signal to stripe 4*a*. However, now the resonant path to ground is via coil 2*f*, and the intersection between stripes 4*a* and 2*b* is energized at high voltage, and hence rendered luminous.

By application of the principle exemplified in the present invention N luminous spots may be produced, utilizing a circuit of $\sqrt{N}$ crystals and $\sqrt{N}$ coils, by judicious choice of frequency range and circuit Q. For example, a series of 100 crystals may be employed having series resonant values 100 kc., 101 kc., 102 kc. . . . 199 kc. The second harmonic response of these crystals then covers the range 200 kc., 201 kc., 204 kc. . . . 396 kc. The fourth harmonic range extends the band. By utilizing additional harmonics the total range of frequencies available may become extensive.

It is, of course, not necessary to employ any specified harmonics of crystal frequencies. For example, a crystal having a fundamental frequency $f_0$ may be so employed that only its responses between the 10th and 20th harmonics are utilized, and considerable scope is available to the designer in selecting crystal frequencies, and harmonic operating values, to provide a maximum display with a minimum number of crystals, a minimum of spurious response, and a maximum of dynamic range, in accordance with the principles of the present invention.

While I have described and illustrated one specific example of the present invention it will be clear that variations of the specific details of construction may be resorted to without departing from the true spirit of the invention as defined in the appended claims.

In particular the conductive stripes may consist of metallic wires or may be printed circuitry of any suitable or conventional type, as taught in the U. S. patent to Piper, 2,698,915, coatings of conductive material, such as aquadag, or the like.

What I claim is:

1. A visual display device, comprising a matrix of conducting elements, said matrix including a first set of separated conductors extending generally in coordinate directions, a second set of separated conductors extending generally in coordinate directions and each crossing all of said first set of separated conductors in non-contacting relation, electroluminescent phosphor interconnecting at least the cross-over points of said sets of conductors, a separate harmonic response filter in series with each conductor of said first set of conductors, a different tuning coil connected in series with each conductor of said second set of conductors, and a signal input terminal connected in parallel to all said filters, said tuning coils each broadly resonating with the condensers formed by said crossed conductors at the frequency of a different one of said harmonic responses.

2. The combination in accordance with claim 1 wherein each of said tuning coils is arranged to resonate with the capacitances provided by said cross-over points over a different set of resonant frequencies of said harmonic response filters, said harmonic response filters arranged to resonate each at a different fundamental frequency, said last named frequencies being adjacent one another.

3. In a visual display device, a plurality of electroluminescent condensers, each having a first conductor and a second conductor separated by electroluminescent material, a filter having harmonic responses connected in parallel with all said condensers, and means series resonating with each of said condensers at a different one of said harmonic responses.

4. A plurality of rows of electroluminescent condensers, a plurality of harmonic filters having plural series resonance points at harmonically related frequencies, a source of a band of frequencies connected in parallel to all said harmonic filters, corresponding harmonic responses of each of said filters lying adjacent one another and extending over a portion of said band of frequencies adjacent one edge thereof, and higher order harmonic responses of said filters lying within said band of frequencies and extending over the remaining portion of said band of frequencies, means connecting the electroluminescent condensers of each row of said electroluminescent condensers in series with a different one of said filters, and means series resonating with each electroluminescent condenser within any one of said rows at a different one of said harmonic responses.

5. The continuation in accordance with claim 4 wherein each of said harmonic filters consists of a piezo-electric crystal and electrodes for said piezo-electric crystal.

6. The combination in accordance with claim 4 wherein said means for series resonating includes single tuning inductances, each connected with a plurality of said electroluminescent condensers selected one from each of said rows.

7. In combination, a first electroluminescent condenser, a second electroluminescent condenser, means resonating with said first electroluminescent condenser at a frequency $f_1$, means resonating with said second electroluminescent condenser at a frequency $f_2$, wherein said frequencies $f_1$ and $f_2$ bear a harmonic relation, a harmonic filter having responses adjacent frequencies $f_1$ and $f_2$, a source of signals in a band including frequencies $f_1$ and $f_2$, and means for applying said signals to said condensers via said filter.

8. In combination, a first set of electroluminescent condensers, a second set of electroluminescent condensers, means broadly resonating with said first set of electroluminescent condensers over a first band of frequencies $f_1$ to $f_2$, means broadly resonating with said second set of electroluminescent condensers over a second band of frequencies $f_3$ to $f_4$, the separate sets of frequencies generally including frequencies which have harmonic relations between frequencies of one set and frequencies of the other set, at least one harmonic filter having two harmonically related responses, one falling in said first band and the other falling in said second band, and means for connecting said harmonic filter separately in series with each of said sets of condensers.

9. In combination, a plurality of sets of electroluminescent condensers, means resonating with each of said sets of electroluminescent condensers over a different sub-band of frequencies, said sub-bands of frequencies together constituting one continuous band of frequencies, and frequencies similarly positioned within the several sub-bands being harmonically related, a set of harmonic filters covering adjacent increments within the sub-band of lowest frequencies, means for connecting said harmonic filters one for one with the electroluminescent condensers of sub-band of lowest frequencies, means for also connecting each harmonic filter with one electroluminescent condenser from each of the remaining sub-bands.

10. In a frequency indicator, a first visual indicator, a first circuit including said first visual indicator, said first circuit resonating at a first frequency, a second circuit including said second visual indicator, said second circuit resonating at a second frequency harmonically related to said first frequency, a single narrow band harmonic filter having a response to said first frequency and to said second frequency, and means for applying a band of frequencies including said first and second frequencies in parallel to said indicators via said harmonic filter.

11. In a frequency indicator, a set of harmonic filters which respond to the frequencies $f$, $f+\Delta f$, $f+2\Delta f$, $f+3\Delta f$ . . . , where $\Delta f$ is a small increment of frequency and wherein the selectivity of each filter is of the order of $\Delta f$, a first plurality of capacitive visual indicators, one connected to each of said filters, a single inductive device for simultaneously broadly resonating with all said visual indicators to respond to any frequency in the band $f$, $f+\Delta f$, $f+2\Delta f$, $f+3\Delta f$ . . . , a further plurality of capacitive indicators, one connected to each of said filters, a further single inductive device for simultaneously broadly resonating with all said further plurality of visual indicators to respond to any frequency in the band $nf$, $nf+n\Delta f$, $nf+2n\Delta f$ . . . , where $n$ has a value such that $f$ and $nf$ are harmonically related.

References Cited in the file of this patent

UNITED STATES PATENTS

| | | |
|---|---|---|
| 1,814,399 | Meissner | July 14, 1931 |
| 1,830,532 | Eberhard | Nov. 3, 1931 |
| 2,017,897 | Emersleben | Oct. 22, 1935 |
| 2,556,586 | Johnston | June 12, 1951 |
| 2,694,785 | Williams | Nov. 16, 1954 |
| 2,698,915 | Piper | Jan. 4, 1955 |